May 23, 1933.  C. R. HOYME  1,910,166
VEHICLE BODY
Filed Oct. 16, 1930  2 Sheets-Sheet 2
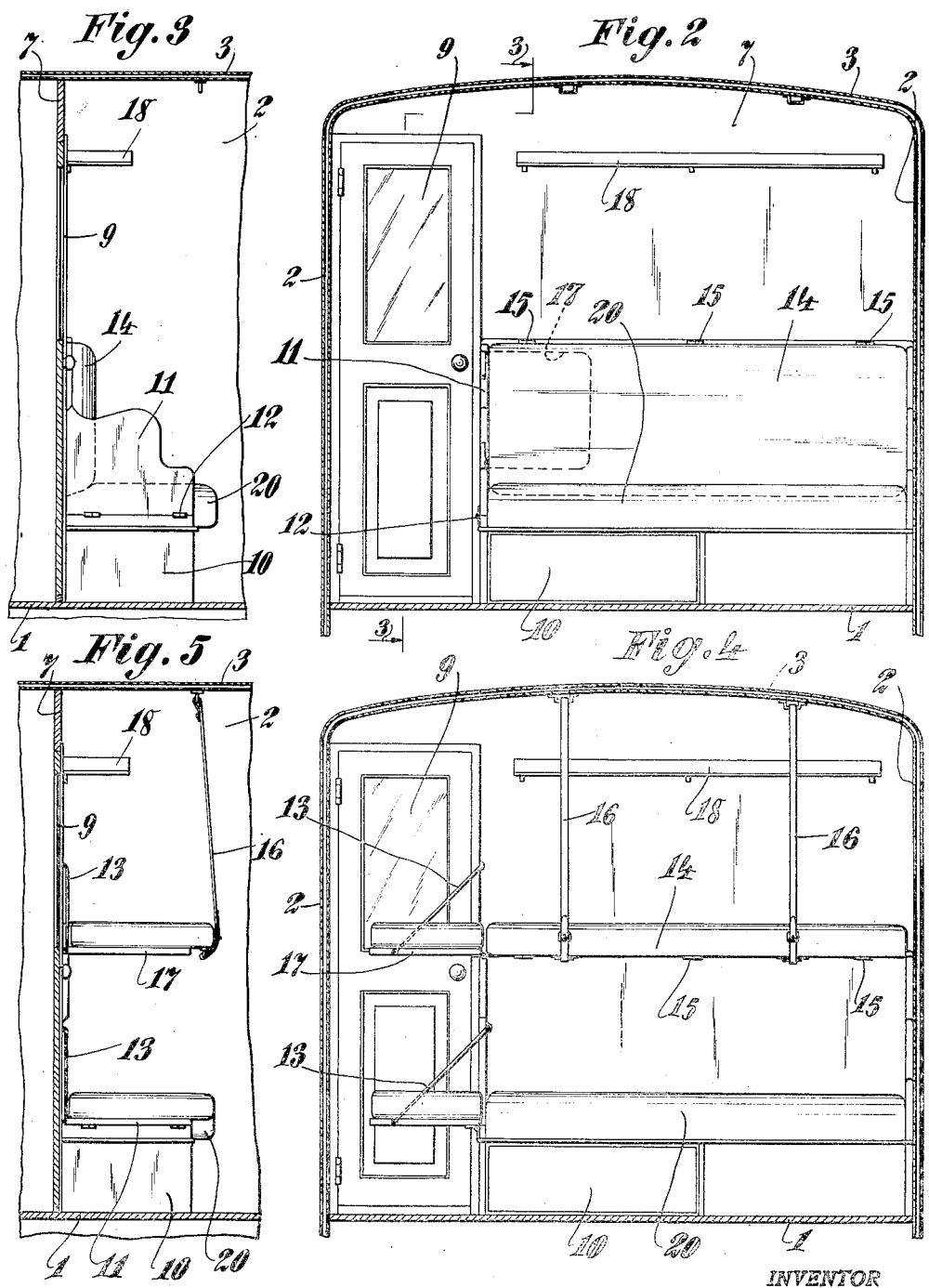
INVENTOR
Christopher Robert Hoyme,
BY Redding, Greeley, O'Shea & Campbell
HIS ATTORNEYS Patented May 23, 1933

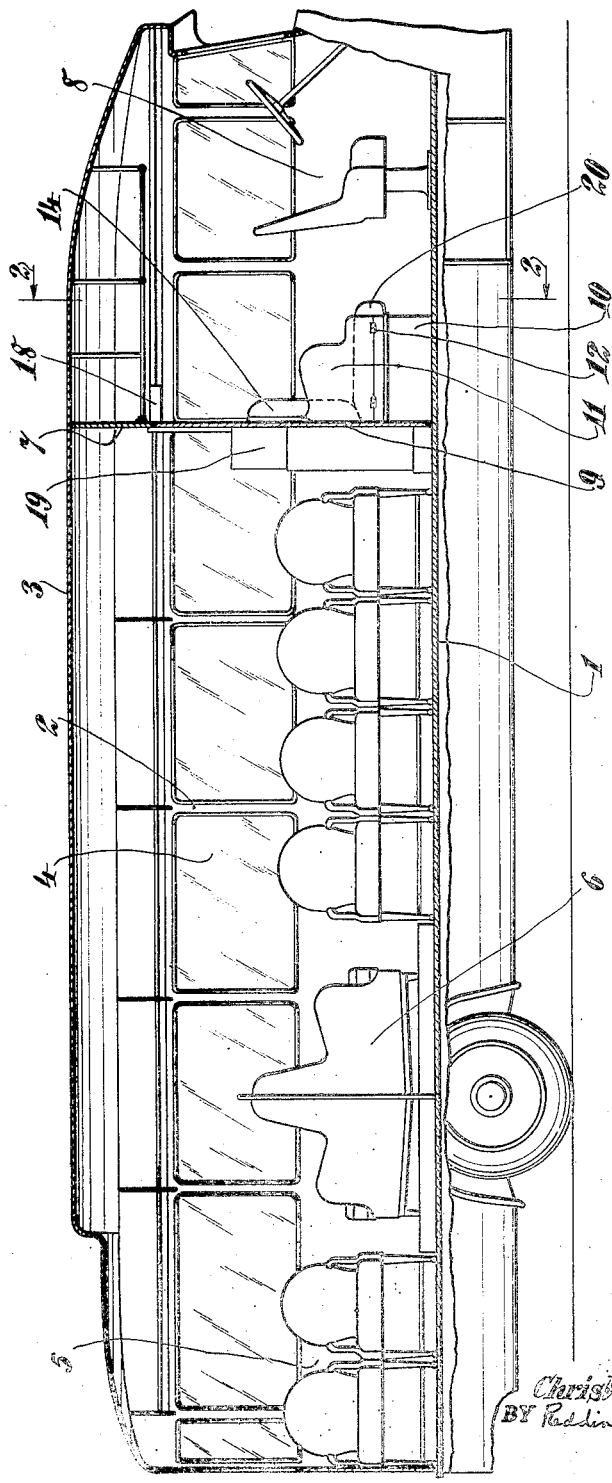

1,910,166

UNITED STATES PATENT OFFICE

CHRISTOPHER ROBERT HOYME, OF CHICAGO, ILLINOIS, ASSIGNOR TO INTERNATIONAL MOTOR COMPANY, OF NEW YORK, N. Y., A CORPORATION OF DELAWARE

VEHICLE BODY

Application filed October 16, 1930. Serial No. 489,038.

The present invention relates to vehicle bodies and embodies, more specifically, an improved body for commercial vehicles, the body being constructed in such manner as to form isolated compartments which serve as a great convenience and comfort to the passengers of the vehicle during transit. More particularly, the invention includes a commercial vehicle body formed with a bulkhead forwardly of the body to shut off the forward view of the passengers.

It is a matter of common knowledge that a forward view of the passengers of a motor vehicle materially detracts from the comfort of the passengers since they are very conscious of possible dangers and thus, the forward view to a large extent results in a restless journey. With a view to providing a commercial vehicle which is constructed to shut off the forward view of the passengers, the present invention has been designed, additional features being incorporated therewith to add to the convenience and pleasure of passenger transportation.

A further object of the invention, accordingly, is to provide a forward compartment which may serve as a smoking and forward observation compartment, this compartment being further adapted to serve as a sleeping compartment for the motor vehicle crew.

A further object of the invention is to provide a bulkhead construction of such character as to afford a hanger for a berth in a vehicle construction.

A further object of the invention is to provide in combination with a bulkhead construction of the character described above, a buffet which is conveniently constructed and accessible to the passengers of the vehicle.

Further objects, not specifically enumerated above, will be apparent as the invention is described in greater detail, in connection with the accompanying drawings, wherein:

Figure 1 is a view in vertical section, taken on the longitudinal axis of a motor vehicle constructed in accordance with the present invention.

Figure 2 is a view in section, taken on line 2—2 of Figure 1, and looking in the direction of the arrows.

Figure 3 is a view in section, taken on line 3—3 of Figure 2, and looking in the direction of the arrows.

Figure 4 is a view similar to Figure 2, showing the forward compartment changed to the forward sleeping quarters for the vehicle crew.

Figure 5 is a view similar to Figure 3, showing the elements in position shown in Figure 4.

Referring to the above drawings, a vehicle floor is shown at 1, upon which is mounted side walls 2 and a top 3, windows 4 being provided in the usual manner, and a rear observation section 5 also being formed at the rear of the body. Over the rear wheel housings, Pullman seats 6 are provided, these seats concealing objectionable portions of the wheel housings which project into the vehicle body.

Forwardly of the body a bulkhead 7 is provided, this bulkhead being secured within the body and forming a transverse partition thereacross. The bulkhead thus provides a forward driving, observation and smoking compartment 8. A suitable door 9 is hinged in the compartment to provide access between the forward compartment and the main body portion of the vehicle.

Upon the forward side of the bulkhead 7, a seat 20 is mounted, suitable drawer and closet space 10 being provided under the seat. The side 11 of the seat adjacent the door 9 is preferably hinged at 12 to enable the side to be moved into a horizontal position as shown in Figure 4, to increase the effective length of the seat in order that it may serve as a bed. A strap 13 or other supporting means may be provided to hold the side in the position shown in Figure 4.

To afford an upper berth, the seat is provided with a back 14 which is hinged at 15 to permit the same to be swung outwardly into the position shown in Figure 4. Straps 16 may be provided to suspend the back in its horizontal position and an extension 17 may be provided to give added length thereto as described in connection with the seat portion. This extension is folded back between the bulkhead and the back member when the latter is swung into a vertical and normal position. The dotted lines in Figure 2 illustrate the position of this member under such circumstances.

Above the seat, described above, a shelf 18 may be provided, if desired. Upon the rearward side of the bulkhead, a buffet 19 is mounted, this buffet being constructed in accordance with known practice to add to the convenience of the passengers. It will thus be seen that the view of the passengers forwardly is obstructed. The bulkhead which obstructs the forward vision is constructed in such fashion as to form convenient compartments, the forward of which is adapted to serve as a sleeping compartment, as well as a smoking and forward observation compartment.

In addition to the foregoing functions, the bulkhead eliminates motor noises and affords a comfortable and private compartment which is quiet and extremely restful.

It furthermore eliminates windshield glare from vehicles approaching from the rear and affords a private driving compartment by means of which the driver is spared annoying conversation during operation.

While the invention has been described with specific reference to the accompanying drawings, it is not to be limited, save as defined in the appended claim.

I claim as my invention:

In a motor vehicle body having a passenger carrying portion and a control portion, an opaque bulkhead between the said portions, a seat transverse to the body carried by the bulkhead and including a seat portion and an independent back portion hingedly mounted on the bulkhead whereby the said back portion may be moved into a horizontal position, an extension hinged on the seat portion in a normally vertical plane to form an end for the seat and adapted to swing into a horizontal position to form a continuation of the seat, an extension hinged on an end of the back portion and adapted to swing into a horizontal plane to form a continuation of the back portion when the latter is moved into a horizontal position, means to suspend the extensions from the body, and means to suspend the side of the back portion opposite the hinge means from the top of the body.

This specification signed this 6th day of October A. D. 1930.

CHRISTOPHER ROBERT HOYME.